(12) United States Patent
Glazer et al.

(10) Patent No.: US 7,631,191 B2
(45) Date of Patent: *Dec. 8, 2009

(54) SYSTEM AND METHOD FOR AUTHENTICATING A WEB PAGE

(76) Inventors: Elliott Glazer, 14107 Chiasso Ter., Chesterfield, VA (US) 23838; Dirk White, 6638 W. Via Montoya, Glendale, AZ (US) 85310; David Armes, 4035 W. Banff La., Phoenix, AZ (US) 85033; Fred Alan Bishop, 2811 W. Dynamite Blvd., Phoenix, AZ (US) 85085; Michael Barrett, 9182 E. Carribean La., Scottsdale, AZ (US) 85260

( * ) Notice: Subject to any disclaimer, the term of this patent is extended or adjusted under 35 U.S.C. 154(b) by 182 days.

This patent is subject to a terminal disclaimer.

(21) Appl. No.: 11/423,340

(22) Filed: Jun. 9, 2006

(65) Prior Publication Data
US 2006/0218391 A1 Sep. 28, 2006

Related U.S. Application Data

(63) Continuation of application No. 09/656,074, filed on Sep. 6, 2000, now Pat. No. 7,203,838.

(60) Provisional application No. 60/153,004, filed on Sep. 9, 1999.

(51) Int. Cl.
*H04L 9/32* (2006.01)
(52) U.S. Cl. .................................................. 713/176
(58) Field of Classification Search .............. 713/201, 713/180, 176
See application file for complete search history.

(56) References Cited

U.S. PATENT DOCUMENTS 5,261,043 A  11/1993  Wolber et al.
5,365,360 A  11/1994  Torres
(Continued)

FOREIGN PATENT DOCUMENTS

WO  WO9750036  12/1997

OTHER PUBLICATIONS

Nayeem Isiam, Rangachari Anand, Trent Jaeger, and Josyula R. Rao; "A Flexible Security Model for Using Internet Content"; Jun. 28, 1997.

(Continued)

*Primary Examiner*—Kambiz Zand
*Assistant Examiner*—William S Powers
(74) *Attorney, Agent, or Firm*—Snell & Wilmer L.L.P.

(57) ABSTRACT

The present invention provides for an icon with an additional level of functionality that allows a user to validate that current information (e.g., a web page) originates from the true owner of the icon and is not merely a copy. The method includes a user requesting a web page from a web site using a web browser. The web server receives the request, retrieves the web page and forwards it to an authentication server. The authentication server inserts an authenticity key into the web page, then the page (including the authenticity key) is returned to the user. If the page includes an authenticity key, the authenticity is verified at the user's computer because the user computer includes logic (e.g., software) to verify the authenticity. During the user configuration process, the user defines an authenticity stamp which determines the format of an authenticated page.

32 Claims, 12 Drawing Sheets

U.S. PATENT DOCUMENTS

| | | | |
|---|---|---|---|
| 5,497,422 | A | 3/1996 | Tysen et al. |
| 5,530,856 | A | 6/1996 | Dahod et al. |
| 5,606,609 | A * | 2/1997 | Houser et al. ............... 713/179 |
| 5,752,022 | A | 5/1998 | Chiu et al. |
| 5,765,176 | A | 6/1998 | Bloomberg |
| 5,809,317 | A | 9/1998 | Kogan et al. |
| 5,872,850 | A * | 2/1999 | Klein et al. ............... 705/51 |
| 5,889,868 | A | 3/1999 | Moskowitz et al. |
| 5,890,170 | A | 3/1999 | Sidana |
| 5,892,904 | A | 4/1999 | Atkinson et al. |
| 5,893,127 | A | 4/1999 | Tyan et al. |
| 5,905,800 | A | 5/1999 | Moskowitz |
| 5,907,619 | A | 5/1999 | Davis |
| 5,930,792 | A | 7/1999 | Polcyn |
| RE36,444 | E | 12/1999 | Sanches Frank et al. |
| 6,016,491 | A | 1/2000 | Kou |
| 6,247,047 | B1 | 6/2001 | Wolff |
| 6,286,001 | B1 * | 9/2001 | Walker et al. ............... 707/9 |
| 6,366,912 | B1 * | 4/2002 | Wallent et al. ............... 707/9 |
| 6,453,416 | B1 * | 9/2002 | Epstein ............... 713/170 |
| 6,539,093 | B1 | 3/2003 | Asad et al. |
| 6,618,717 | B1 | 9/2003 | Karadimitriou et al. |
| 6,681,017 | B1 * | 1/2004 | Matias et al. ............... 380/277 |
| 6,735,694 | B1 | 5/2004 | Berstis et al. |
| 6,778,986 | B1 | 8/2004 | Stern et al. |
| 6,785,717 | B1 | 8/2004 | Nickerson et al. |
| 2001/0056487 | A1 | 12/2001 | Yoo |
| 2002/0002543 | A1 | 1/2002 | Spooren et al. |
| 2002/0029252 | A1 | 3/2002 | Segan et al. |
| 2002/0124172 | A1 | 9/2002 | Manahan |
| 2003/0023878 | A1 | 1/2003 | Rosenberg et al. |
| 2003/0093699 | A1 | 5/2003 | Banning et al. |
| 2003/0110384 | A1 | 6/2003 | Carro |
| 2003/0131048 | A1 | 7/2003 | Najork |
| 2003/0158823 | A1 | 8/2003 | Fulton et al. |
| 2004/0078452 | A1 | 4/2004 | Jamieson |

OTHER PUBLICATIONS

Network Working Group; "The Secure HyperText Transfer Protocol"; also available on http://www.landfield/com/rfcs/rfc2660.html.

"Test of Signal HTML"; also available on http://www.crafeidl.ac.uk/docs/email/pgp/html/signed_html.html.

"PGP Signed Web-Pages"; also available on http://www.pobox.com/~ejnbell/pgp-www.html.

http://www-server.bcc.ac.uk/~ccaamrg/seal/seal.html (site not accessible).

* cited by examiner

```
<OBJECT ID="Checker" CLASSID="CLSID:B2157787-7492-11D4-8296-
00609430A416"
CODEBASE="APge.dll"
SIGN="Tud9LuaH9v5QMQcHGUAmtDNhvZ3nGtUEHUMiGIsORV8v7JF9fp
IBiq3Jod0SvdCqQxq+4DzXc
SDK+5r6dbpJMTKiZQWLJpwNJuJSS+cfywEXdQHxcOpRt8Hryi833Bg41s
AIT+SCg5j7DBIzsvIVwohe
chGYv5476AOavkoJrD4="></OBJECT>
```

FIG. 11

SYSTEM AND METHOD FOR AUTHENTICATING A WEB PAGE

CROSS-REFERENCE TO RELATED APPLICATIONS

This application is a continuation of and claims priority to U.S. application Ser. No. 09/656,074 filed on Sep. 6, 2000, which application is a non-provisional of and claims priority to U.S. Provisional Application No. 60/153,004, filed Sep. 9, 1999, the entire contents of which are hereby incorporated by reference.

FIELD OF THE INVENTION

The present invention relates generally to computer security, and more particularly, to systems and methods for authenticating a web page.

BACKGROUND OF THE INVENTION

Web pages often include icons, such as, corporate logos, patterns, characters, symbols or other indicators, that a user associates with a particular offering in the real world. A trust or good will is often associated with the recognition of a given set of icons. These icons are implemented, for example, as bitmaps, but unfortunately, these bitmaps can be copied and used to defraud a prospective customer. Additionally, customers rely on the accuracy of a URL of a web page. However, it is relatively easy for a "fraudster" to register a URL that is like the one the user is expecting, but is not quite the same. For example, "www.bigbank.com" vs. "www.bigbank.com" (with an "l" instead of an "i"). Thus, a user may retrieve an unwanted webpage that appears authentic. Therefore, the user may not always be confident that the web page being viewed is authentic and the true owner of a web page may be uncertain.

In addition to a user's lack of confidence in the true owner of a web page, there currently exists a problem (either real or perceived) in the transport of UserIDs/Passwords across the Internet. While most sites provide security, for example by using a secure protocol such as Secure Hypertext Transfer Protocol (HTTPS) for sensitive data, most consumers are complacent about checking for this security. Thus, a need exists for a system and method that allow a page to be authenticated so that a user feels secure in the authenticity of pages displayed from Internet sites.

SUMMARY OF THE INVENTION

In exemplary embodiments of the invention, a user requests a web page from a web site using a web browser. The web server receives the request, retrieves the web page and forwards it to an authentication server. The authentication server inserts an authenticity key into the web page, then the page (including the authenticity key) is returned to the user. If the page includes an authenticity key, the authenticity is verified at the user's computer because the user computer includes logic (e.g., software) to verify the authenticity.

In exemplary embodiments, the authenticity verification software is a browser plug-in and is configured by the user after it is downloaded to the user's computer. During the user configuration process, the user defines an authenticity stamp which determines the format of an authenticated page. In alternative embodiments, the user defines a non-authenticity stamp which will appear on non-authenticated pages.

BRIEF DESCRIPTION OF THE DRAWINGS

The above and other features and advantages of the present invention are hereinafter described in the following detailed description of illustrative embodiments to be read in conjunction with the accompanying drawing figures, wherein like reference numerals are used to identify the same or similar parts in the similar views, and:

FIG. 11 is an exemplary authenticity key.

DETAILED DESCRIPTION

The present invention provides for an icon with an additional level of functionality that allows a user to validate that current information (e.g., a web page) originates from the true owner of the icon and is not merely a copy. In various exemplary embodiments of the invention, a hierarchy of validations exists which allow not only for the validation of an individual icon, but also for the validation of screens and Uniform Resource Locators (URLs). Unlike Secure Sockets Layer (SSL) or other "security session" protocols, the present invention validates aspects of the screen display independent of the communications channel between the user and the web site (however, security session protocols may be used in addition to the present invention). The validation is performed using only information that the true owner of the icon can possess.

Figure 1:
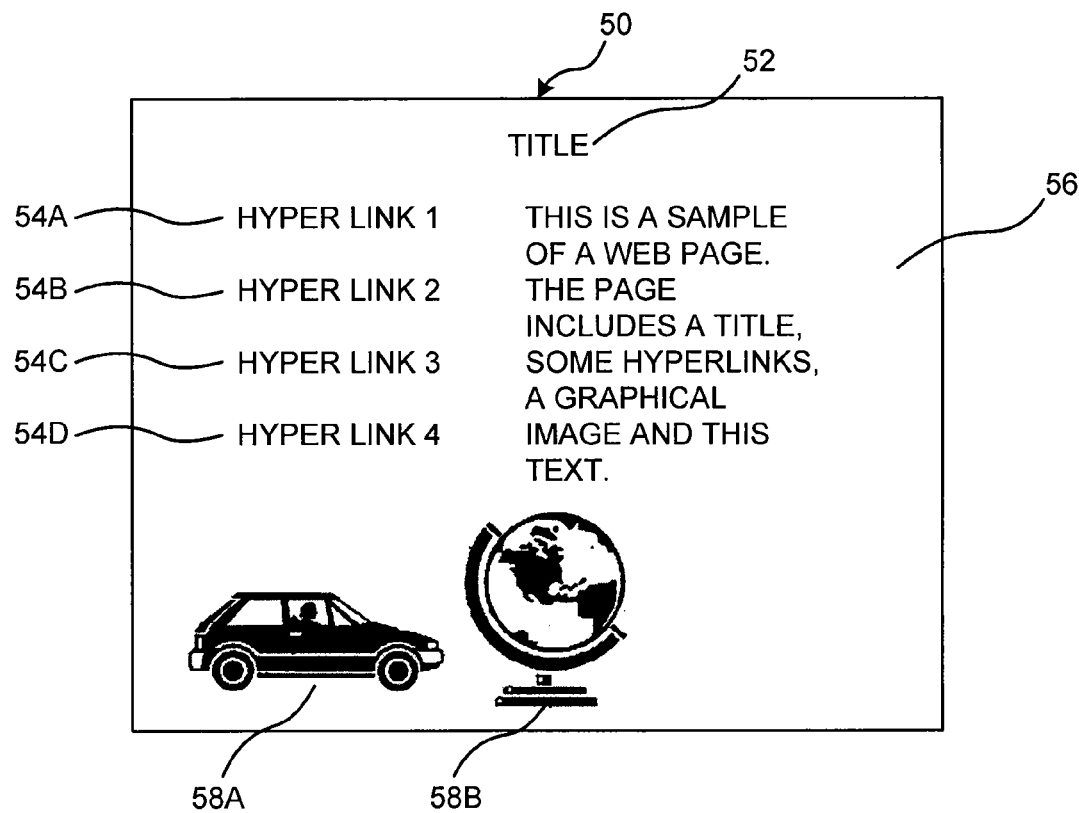
FIG. 1 is an exemplary web page that has not been authenticated.

FIG. 1 is an example of a simple web page. The web page 50 includes a title 52, several hyperlinks 54A, 54B, 54C and 54D, some textual information 56 and two graphical images 58A and 58B.

Figure 2:
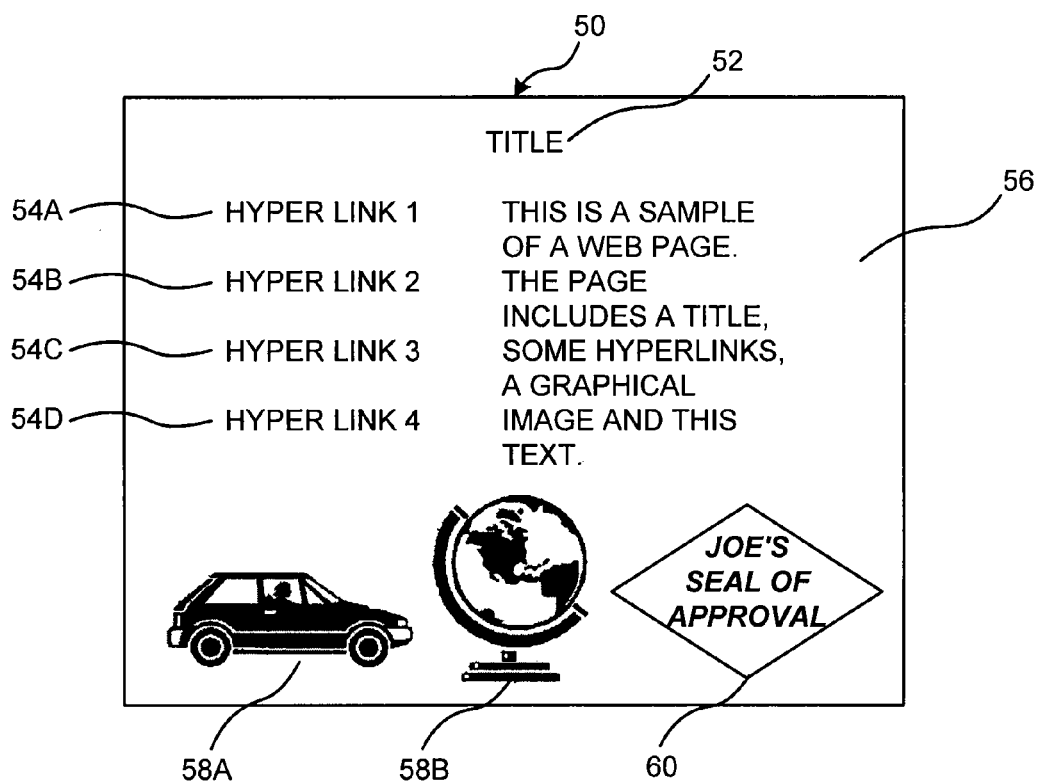
FIG. 2 is the exemplary web page of FIG. 1 that has been authenticated in accordance with the present invention.

A web page that has been authenticated using the present invention will include all of the information in the same format as the non-authenticated page. As shown in FIG. 2, in addition to the information that would normally be displayed, an authenticated page includes an authenticity stamp 60 in which the user can specify the appearance of the authenticity stamp. For example, the user of the example shown in FIG. 2 defined the authenticity stamps to be a diamond shape which includes text (bold and italicized) that states "JOE'S SEAL OF APPROVAL." it will be appreciated that an unlimited number of variations of an authenticity stamp are possible. A user can configure the stamp to be graphics only, text only or a combination thereof. The user also specifies the color and other attributes of the stamp, for example, a blinking stamp. The user also specifies the location of the stamp, e.g., bottom right corner of the web page, pop-up dialog box, etc. In exemplary embodiments, the authenticity stamp can be audio instead of or in addition to visual. In alternative embodiments, a non-authenticated page is stamped and an authenticated page is not stamped. For example, the stamp is configured to be a red, flashing icon that reads "PAGE NOT AUTHENTICATED" in the upper right-hand corner, while a page that is authenticated does not include this stamp. In alternative examples, the user can define both an authenticity stamp and a non-authenticity stamp.

Figure 3:
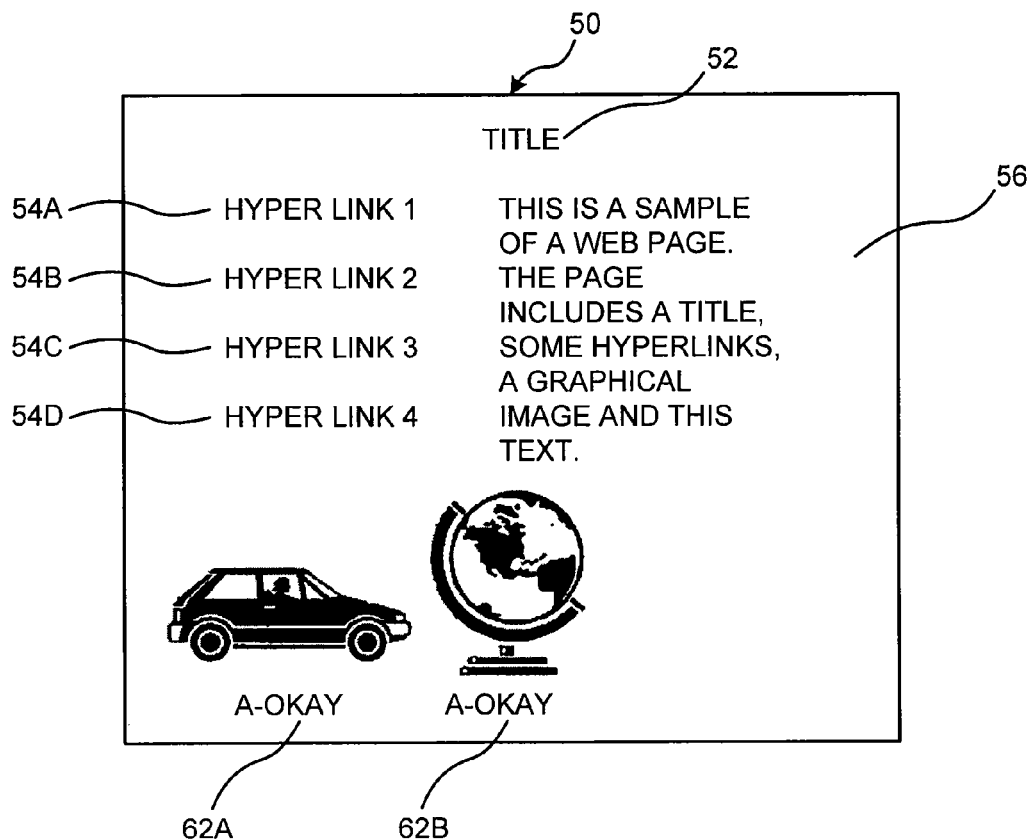
FIG. 3 is the exemplary web page of FIG. 1 that has been authenticated using an alternative embodiment of the present invention.

FIG. 3 illustrates an alternative embodiment wherein each graphical image includes an embedded authenticity stamp 62A and 62B. In the example illustrated in FIG. 3, each graphical element has an authenticity stamp containing the text "A-OKAY" embedded in the graphical image. In exemplary embodiments, the authenticity stamp is defined by the user. In other embodiments, the authenticity stamp is defined by the owner of the page being displayed (e.g., the web server). In such embodiments, the stamp can include the name of the trusted entity (i.e., the true owner of the page).

Figure 4:
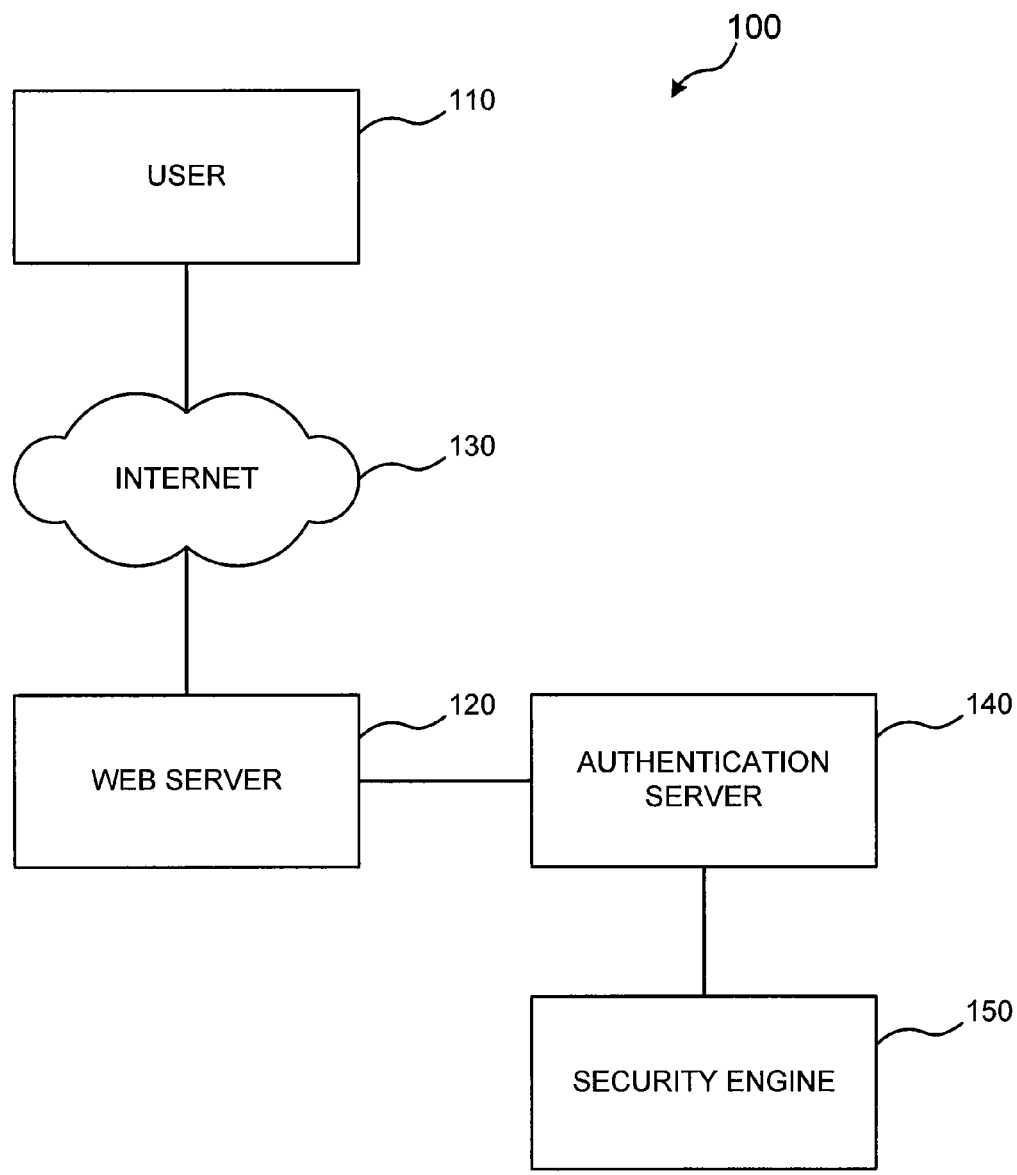
FIG. 4 is a block diagram of an exemplary system configuration suitable for implementing the present invention.

FIG. 4 is a block diagram of an exemplary environment 100 suitable for implementing the present invention. The system 100 includes one or more clients (e.g., users) 110 that communicate with one or more servers (e.g., web servers) 120. The users 110 can use any type of computing device that includes a display device, for example, a Personal Computer. It will be appreciated that other computing devices can be used, for example, a Personal Digital Assistant (PDA), a hand-held computing device, a cellular telephone, etc. The web server can be any site, for example a commercial web site, such as a merchant site, a government site, an educational site, etc. The user 110 establishes a connection to the web server 120 via a network 130, such as the Internet. The user 110 and web server 120 can communicate using a secure protocol (e.g., HTTPS) or a non-secure protocol (e.g., HTTP). The user 110 requests information from the web server 120, and in exemplary embodiments, the information is communicated using web pages, for example using Hyper-Text Markup Language (HTML). The web pages are displayed on the user's computer 110, for example, using a browser, such as, Netscape Communicator available from the Netscape Corporation of Mountain View, Calif. or Internet Explorer available from the Microsoft Corporation of Redmond, Wash. Prior to sending the requested web page to user 110, web server 120 submits the information to authentication server 140 where authenticating information is added. The information which includes the authenticating information is returned to the web server 120 which then sends the web page including the authentication information to the user 110.

In various exemplary embodiments, the authentication server 140 communicates with a security engine 150, for example to verify UserID/Password logons or single use passwords or identifiers. In exemplary embodiments, the security engine 150 is a commercially available security engine, such a, Siteminder available from Netegrity Corporation, of Waltham, Mass.

The examples illustrated and described herein are directed to exemplary embodiments in which a user utilizes a web browser to request web pages from a web server. However, it will be appreciated that various embodiments are possible wherein a client (e.g., web browser) requests content (e.g., a web page) from a server (e.g., a web server). The present invention allows the server to provide the client with assurance as to the authenticity of the content (e.g., assure the client as to the true owner of the content).

Figure 5:
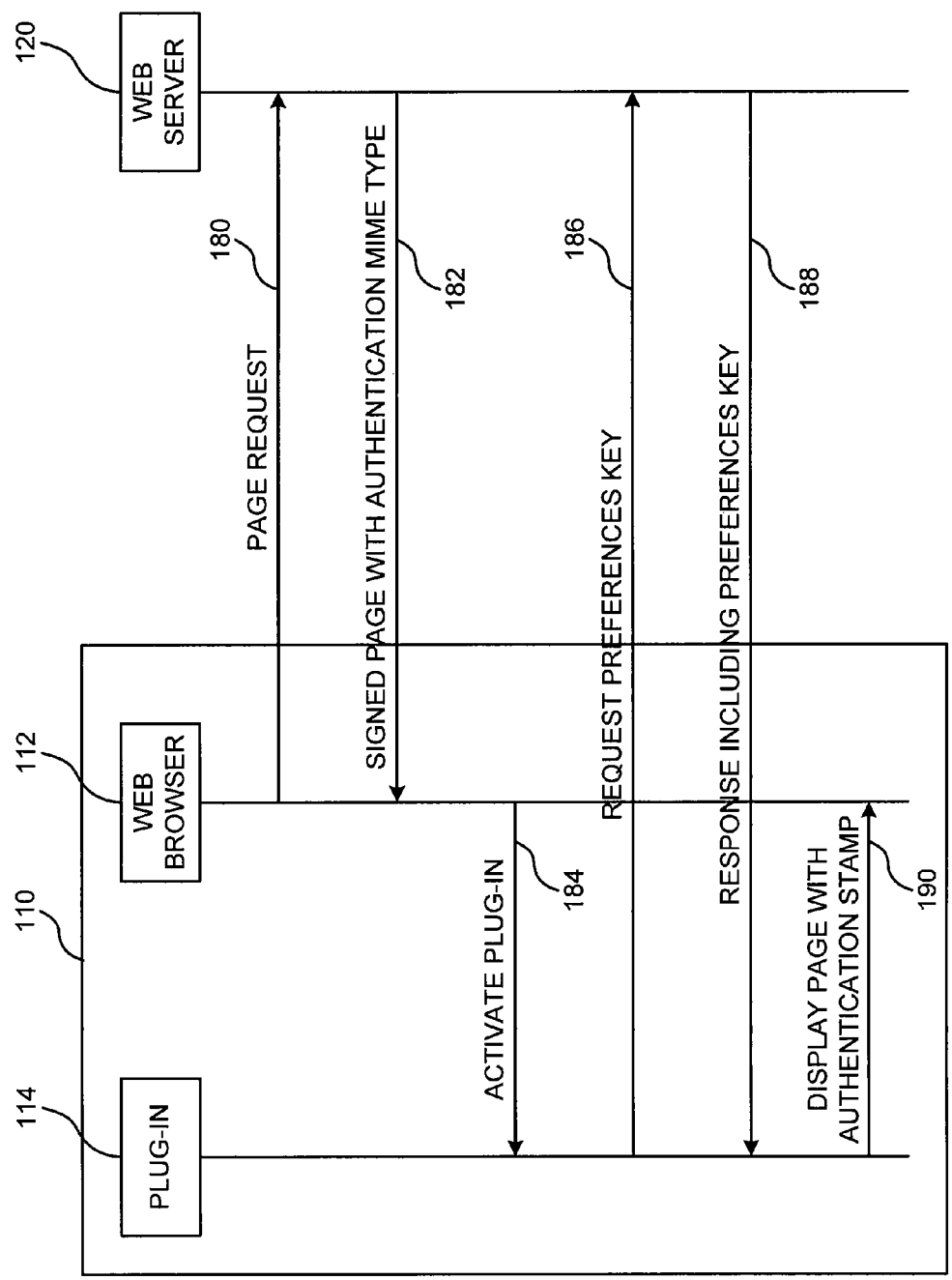
FIG. 5 is a message sequence diagram for performing page authentication in accordance with the present invention.

FIG. 5 is a message sequence diagram illustrating exemplary communications among various components to assure a user of the authenticity of a page. User 110 includes a web browser 112 and a plug-in 114. A user requests a page 180, but the user (e.g., user computer) 110 has no knowledge that the page requested is "special" (e.g., is subject to page authentication). Thus, the page request 180 is a normal page request (e.g., a HTTP or HTTPS request for a page).

The web server 120 receiving the page request 180 determines whether the request is for an authenticated page. If the page is to be authenticated, the page is dynamically signed with a private key and additional information, such as a salt with a time stamp is also included as described in further detail later. The signed page is returned with a special authenticated page MIME type and returned to the web browser 112. Based on the MIME type, the web browser activates the appropriate plug-in 114.

The plug-in 114 uses a public key to verify the signature, and upon verification of the signature, the plug-in can validate the authenticity of the page. The plug-in 114 requests the user's preferences key 186 so that the page can be displayed with an authenticity stamp. In exemplary embodiments, the request for preferences key includes a shared secret and is encrypted with the public key and salt. Upon receipt of the request for preferences key 186, the web server 120 decrypts the request using the private key, validates the shared secret and encrypts the preferences key with the private key, shared secret and salt from the request 186. The encrypted preferences key is then returned to the plug-in 114.

The plug-in 114 reads the preferences file and decrypts it using the preferences key from the web server 120. In exemplary embodiments, the preferences file is stored on the user's 110 file system. However, the location of the file is not readily known to the plug-in 114. Thus, the plug-in 114 must get the preferences key to determine the location of the preferences file. The plug-in 114 reads the preferences file to determine the authenticity stamp and how it is to be displayed. The page is then displayed with the user's preferred authenticity stamp 190.

Figure 7:
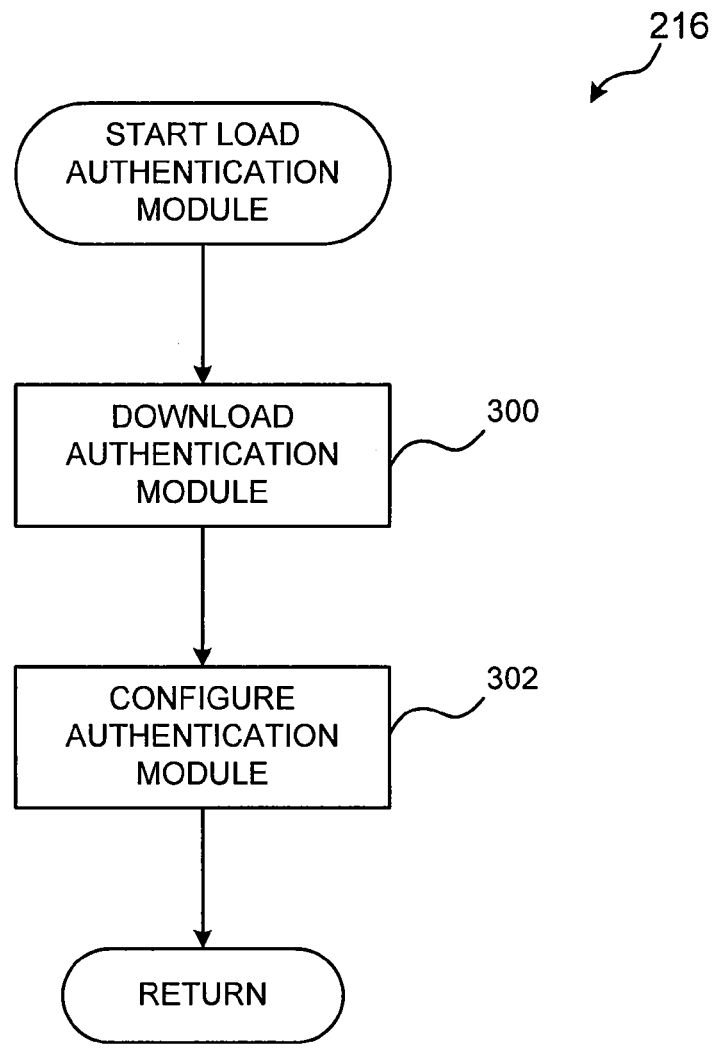
FIG. 7 is a flow diagram illustrating exemplary logic for loading an authentication module in accordance with the present invention.
Figure 8:
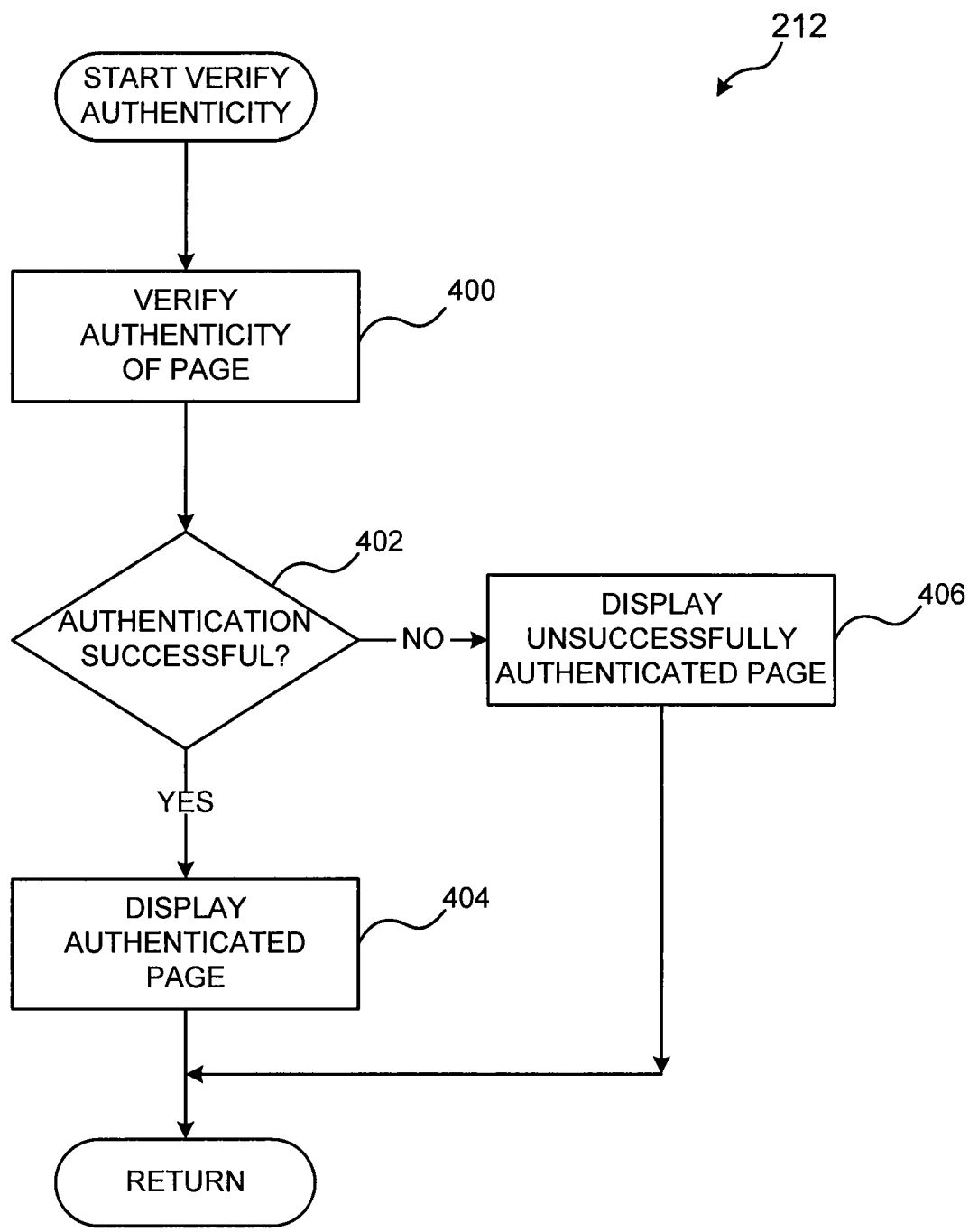
FIG. 8 is a flow diagram illustrating exemplary logic for verifying authenticity and displaying an authenticated page in accordance with the present invention.
Figure 9:
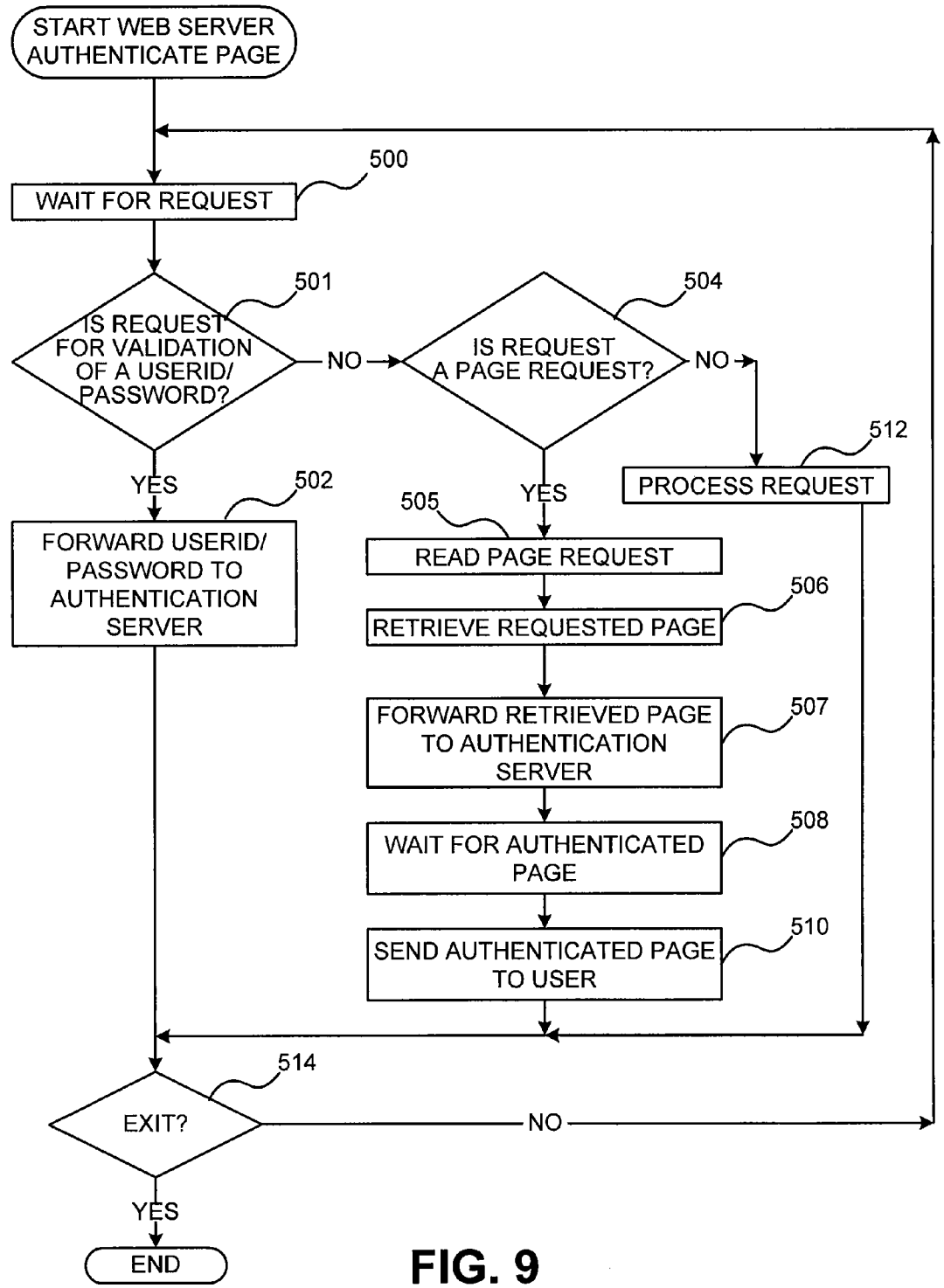
FIG. 9 is a flow diagram illustrating exemplary logic performed by a web server for performing authentication in accordance with the present invention.
Figure 10:
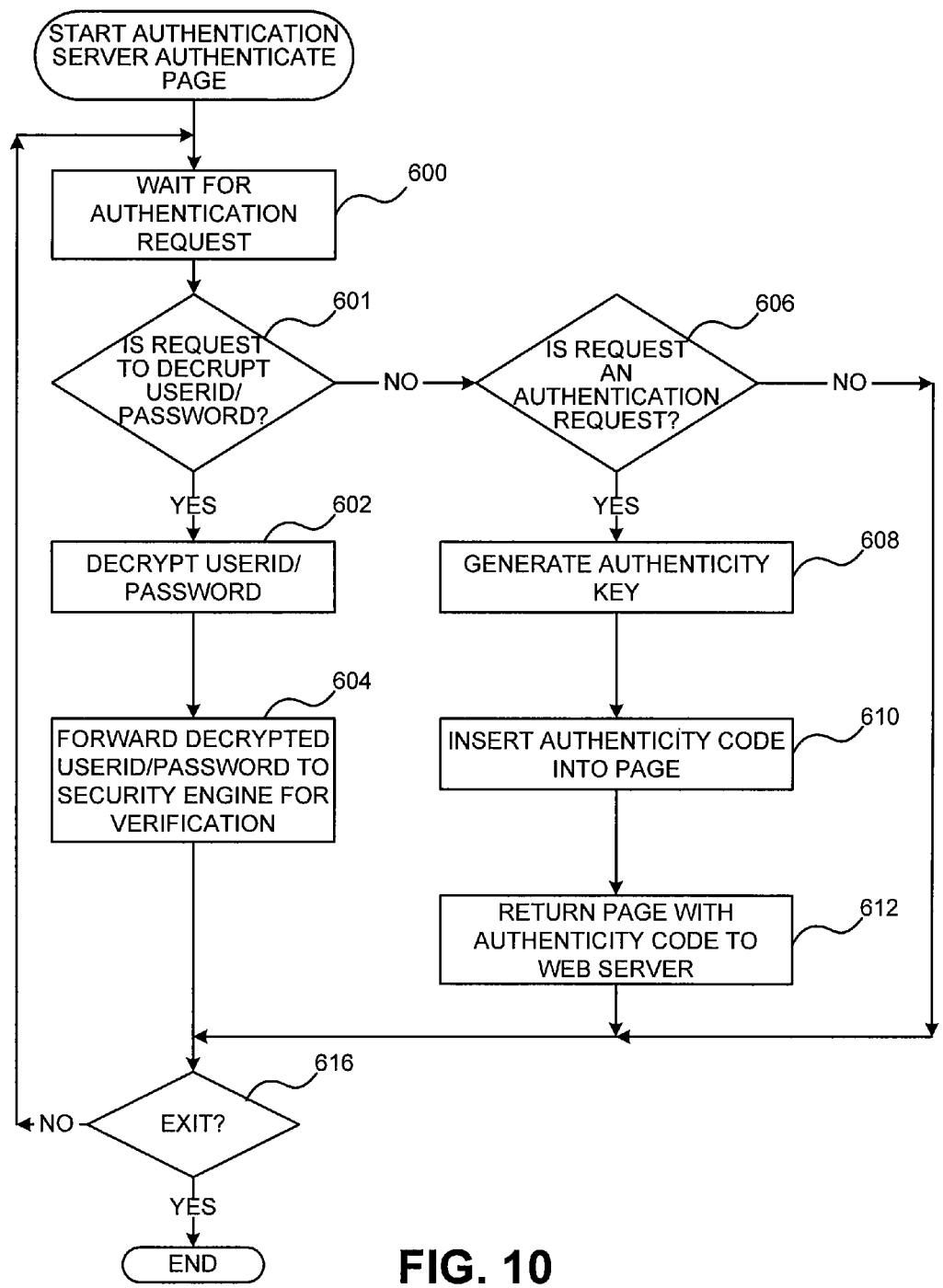
FIG. 10 is a flow diagram illustrating exemplary logic performed by an authentication server in accordance with the present invention.

FIGS. 6A-10 illustrate exemplary logic for performing page authentication in accordance with the present invention. The flow diagrams illustrate in further detail the logic illustrated in the message sequence diagram of FIG. 5. In addition to authenticating a page, the present invention provides for additional security wherein a UserID/Password are encrypted with the public key to prevent "man in the middle" attacks. FIGS. 6A-8 illustrate exemplary logic performed by a user computer 110 as described below. FIG. 9 illustrates exemplary logic performed by a web server 120 as described below. FIG. 10 illustrates exemplary logic performed by an authentication server 140 as described below. It will be appreciated that various configurations are possible. For example, the logic of the authentication server 140 can be combined with the logic of the web server 120.

Figure 6A:
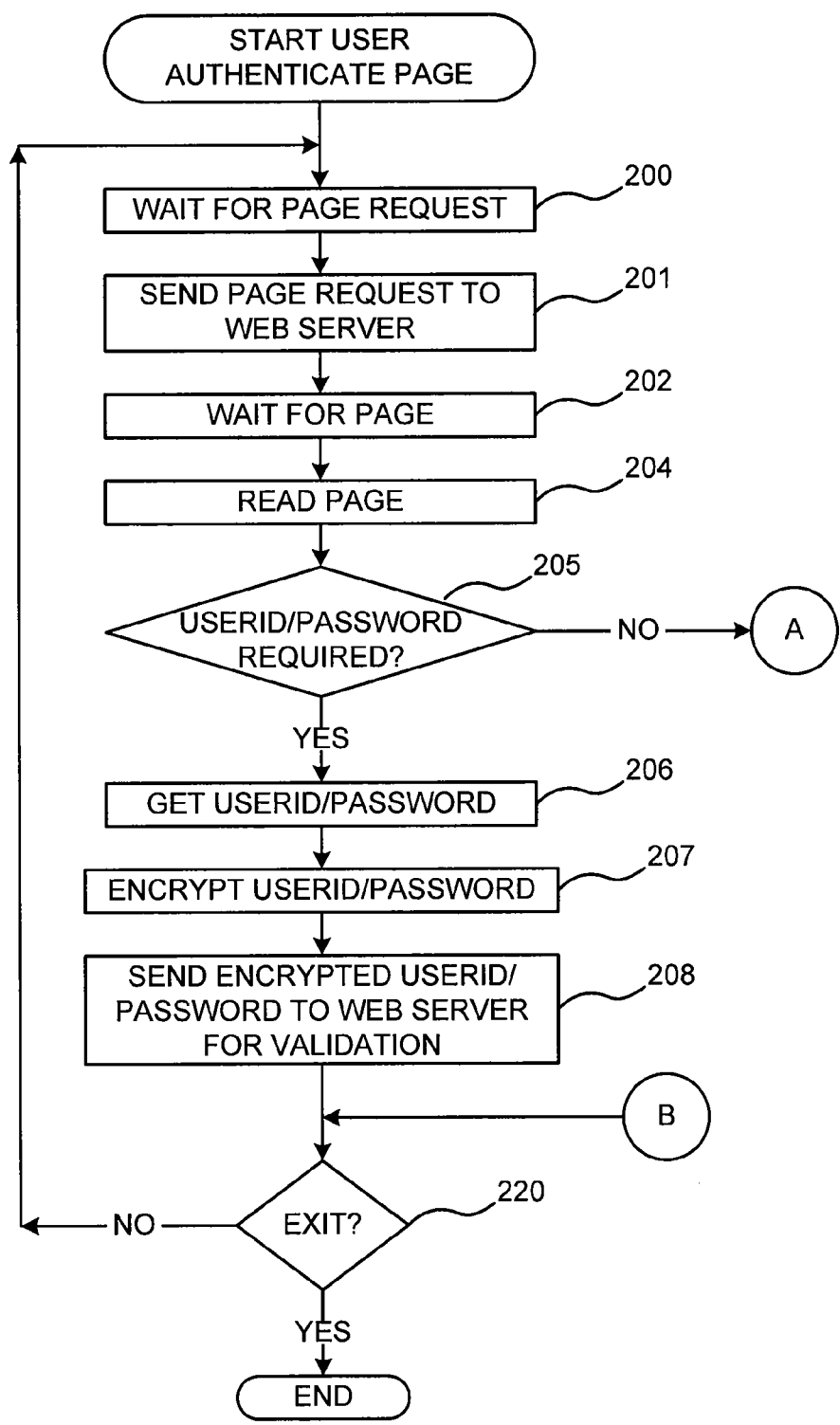
FIGS. 6A and 6B are a flow diagram illustrating exemplary logic performed by a user computer for performing authentication in accordance with the present invention.
Figure 6B:
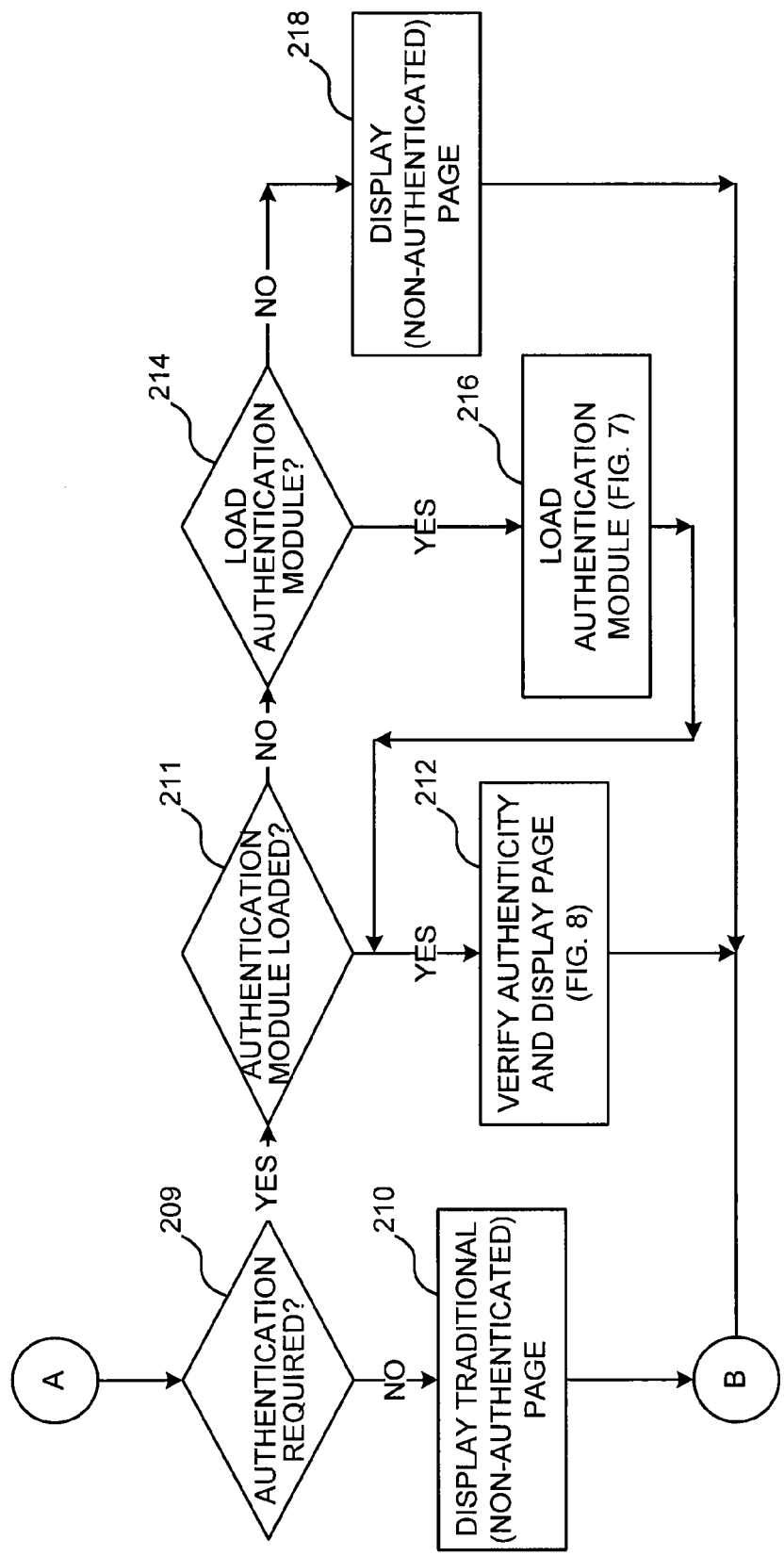

FIGS. 6A and 6B are a flow diagram illustrating exemplary logic performed by a user 110 for performing authentication in accordance with the present invention. The logic described herein is directed to web pages, however it will be appreciated that the information requested can be of various formats. The logic of FIG. 6A moves from a start block to block 200 to wait for a page request. It will be appreciated that a page request is known in the art, for example, a user enters a Uniform Resource Locator (URL) or clicks on a hyperlink. The logic then moves to block 201 where a received page request is sent to a web Server 120 to retrieve the requested page. The logic then moves to block 202 where the user (e.g., the user's browser) waits for the requested page. The logic of retrieving and formatting the requested page is described below with reference to FIGS. 9 and 10. When the requested page is received, the logic moves to block 204 where the page is read.

After a page is read, the logic moves to decision block 205 where a test is made to determine if a UserID/Password is required. It will be appreciated that a UserID/Password may be required for both pages requiring authentication and pages not requiring authentication. If a UserID/Password is required, the logic moves to block 206 where a UserID/Password is obtained. If a UserID/Password is required, a suitable logon screen is displayed on the user's computer. The UserID/Password entry display can be of varying formats, for example, a web page or a pop-up dialog box. Upon entry of a UserID/Password, the user indicates completion (for example, by pressing an "OK" or "Submit" button). Upon completion of the logon, the logic moves to block 207 where the UserID/Password is encrypted to prevent man in the middle attacks. The logic then moves to block 208 where the encrypted UserID/Password is sent to the web Server.

If a UserID/Password is not required, the logic moves to decision block 209 (FIG. 6B) where a test is made to determine if authentication is required. In exemplary embodiments, an authenticity key will be hidden in any page that should be authenticated. In order to determine if the page should be authenticated, the page source is read to determine if an authenticity key is included in the page. If authentication is not required, the logic moves to block 210 where the non-authenticated page is displayed. A non-authenticated page is a traditional web page (i.e., the way the web page would be displayed without the authentication of the present invention, such as the example shown in FIG. 1).

If authentication is required (yes in decision block 209), the logic moves to decision block 211 where a test is made to determine if the authentication module is loaded. In exemplary embodiments, the authentication module is a plug-in module for the web browser. In exemplary embodiments, if the authentication module has not been loaded, a message will be displayed. For example, "This page protected by AuthentiPage, to get a free copy, go to Authentipage.com." Alternatively, the message may ask the user if a download of the authentication module is desired. If the authentication module is not loaded, the logic moves to decision block 214 where a test is made to determine if the authentication module should be loaded. If the authentication module is not to be loaded, the logic moves to block 218 where the page is displayed without authentication. In exemplary embodiments, the user will be notified that the page could not be authenticated, for example via a pop-up window displaying a warning message. In alternative embodiments, the user defines a non-authenticity stamp which is displayed for a page that has not been authenticated.

If the authentication module is to be loaded (yes in decision block 214), the logic moves to block 216 where the authentication module is loaded as shown in FIG. 7 and described next. If a download of the authentication module is desired, the user may be automatically redirected to the download site.

FIG. 7 illustrates exemplary logic for loading an authentication module (block 216 of FIG. 6B). The logic of FIG. 7 moves from a start block to block 300 where the authentication module (e.g., plug-in) is downloaded. The download is accomplished using techniques known in the art. After the authentication module is downloaded to the user's computer, the logic moves to block 302 where the authentication module is configured. As part of the configuration process, an authenticity stamp is defined by the user. This authenticity stamp will be displayed whenever an authenticated page is loaded. The stamp can take several forms, for example, a user-selected keyword, color, etc. Preferably, the determination of the look of the authenticity stamp is under complete control of the user. Preferably, the user is also able to determine where the stamp will be displayed, for example in a separate pop-up box or in a selected area of the web page. By requiring the user to configure the visual qualities of the stamp, the possibility of a counterfeit stamp being displayed is reduced. The user will expect to see his or her stamp and will begin to associate the stamp with security. It will be appreciated that while the stamp is defined in terms of visual qualities herein, embodiments of the invention can include defining the stamp in other ways, for example, by an audio indication specified by the user. After the authentication module has been configured, the logic of FIG. 7 ends and processing returns to FIG. 6B.

Returning to FIG. 6B, after the authentication module is loaded (block 216), or if it has been determined that the authentication module is already loaded (yes in decision block 211), the logic moves to block 212 to verify the authenticity of the page and display the page, as shown in detail in FIG. 8 and described next.

FIG. 8 illustrates exemplary logic for verifying the authenticity of a page and displaying the page. The logic of FIG. 8 moves from a start block to block 400 where the authenticity of the page is verified. Many algorithms can be used to verify the authenticity. For example, the trusted server that generates the authenticity key can encrypt the authenticity key with a private key. The user can then decrypt the authenticity key using a public key. Using this method, no certificate is required and no interaction is required by the user. Other algorithms can be used, some of which may require a certificate and/or user interaction. Unless the page contains confidential information, the authentication of pages should not require any additional security or encryption. The authentication of a page can be employed on any page, for example, marketing data, purchase information, etc., to prove the page's authenticity. In general, authentication of pages will not require additional security or encryption. However, if additional security is desired, page authentication performed in accordance with the present invention can be used in combination with other known or future security measures, for example, in conjunction with a secure protocol, such as HTTPS, along with the requirement for a UserID and a password, etc. If the authentication is successful (yes in decision block 402), the logic moves to block 404 where the page is displayed with the authenticity stamp as defined by the user during the configuration process described above. If the authentication fails (no in decision block 402), the logic moves to block 406 where the unsuccessfully authenticated page is displayed. In exemplary embodiments, an indication of the authentication failure is provided, for example a warning message may be displayed. For example, a flashing error message, such as "PAGE NOT AUTHENTICATED" can be displayed in the location where the authenticity stamp would normally be displayed. After the page is displayed (either as an authenticated page in block 404 or as an unsuccessfully authenticated page in block 406), the logic of FIG. 8 ends and processing returns to FIG. 6B.

Returning to FIG. 6B, after a page has been displayed (block 210, 212 or 218) or a UserID/Password request has been processed, the logic moves to decision block 220 (FIG. 6A) where a test is made to determine if it is time to exit. For example, if the user selects an "Exit" option form a web browser menu, it is time to exit. If it is not time to exit, the logic returns to block 200 to wait for the user's next page request. The logic of blocks 200-220 is repeated until it is time to exit. It will be appreciated that in alternative embodiments of the invention requests other than those shown and described herein may also be processed. When it is time to exit, the logic of FIG. 6A ends.

FIG. 9 is a flow diagram illustrating exemplary logic performed by a web server 120 for performing authentication in accordance with the present invention. The logic of FIG. 9 moves from a start block to block 500 where the web server waits for a request. In exemplary embodiments, while the web server is waiting for a request other requests continue to be serviced (e.g., receiving and processing page requests). When a request is received, the logic moves to decision block 501 where a test is made to determine if the request is a request for validation of a UserID/Password. If so, the logic moves to block 502 where the received UserID/Password (sent in block 108 of FIG. 6A) is forwarded to the authentication server 140.

If the request is not a request for verification of a UserID/Password, the logic moves to decision block 504 where a test is made to determine if the request is a page request. If so, the logic moves to block 505 where the page request is read. The logic then moves to block 506 where the requested page is retrieved. Next, the logic moves to block 507 where the requested page is forwarded to an authentication server 140. The logic then moves to block 508 where the web server waits for the authenticated page to be returned from the authentication server. In exemplary embodiments, while the web server is waiting for an authenticated page, other processing can be performed, for example, page requests can be received and processed. When an authenticated page is received, the logic moves to block 510 where the authenticated page is returned to the user that requested the page.

If the request is not a request to verify a UserID/Password (no in decision block 501) or a page request (no in decision block 504), the request is another request, which is processed in block 512. Other requests which may be processed by a web Server are not described herein.

After the request (e.g., request for verification of UserID/Password, page request or other request) has been processed, the logic moves to decision block 514 where a test is made to determine if it is time to exit. The logic of blocks 500-514 is repeated until it is time to exit (e.g., shut down the web server). When it is time to exit, the logic of FIG. 9 ends.

FIG. 10 is a flow diagram illustrating exemplary logic performed by an authentication server 140 for performing authentication in accordance with the present invention. The logic of FIG. 10 moves from a start block to block 600 where the authentication server waits for an authentication request. When an authentication request is received, the logic moves to decision block 601 to determine if the request is a request to decrypt a UserID/Password. If so, the logic moves to block 602 where the UserID/Password is decrypted. The logic then moves to block 604 where the decrypted UserID/Password is forwarded to a security engine for verification. In exemplary embodiments, the security engine is an existing security engine, such as a DSS Security Engine. The Security Engine verifies the UserID/Password and forwards the verification as appropriate. For example, if the UserID is not valid, a message will be displayed on the user's computer. Because security engines are known in the art, the logic employed by the security engine is not discussed further herein.

If the request is not a request to decrypt a UserID/Password, the logic moves to decision block 606 where a test is made to determine if the request is an authentication request. If so, the logic moves to block 608 where the authentication server generates an authenticity key. Details for an exemplary authenticity key are described below. The logic of FIG. 10 then moves to block 610 where the authenticity key is inserted into the web page. An exemplary authenticity key is shown in FIG. 12. Next, the logic moves to block 612 where the page which includes the authenticity key is returned to the web server.

While the exemplary embodiments only include processing of requests for encryption/decryption or authenticating a page, it will be appreciated that alternative embodiments may process other requests. After a request is processed (e.g., a UserID/Password is decrypted or a page is authenticated), the logic moves to decision block 616 where a test is made to determine if it is time to exit. The logic of blocks 600-616 is repeated until it is time to exit (e.g., shut down the authentication server). When it is time to exit, the logic of FIG. 10 ends.

In alternative embodiments, there is no authentication server. Rather, graphical images include a hidden identifier identifying the true owner, as well as a cryptographic signature to ensure that the graphical image cannot be tampered with by a counterfeiter. In various embodiments, the identification is a portion of a URL that is encrypted, such as "bigbank.com". Those skilled in the art will recognize this as a second-level domain name. Upon receipt of the web page, the authentication module residing on the user's computer compares the identification in the page with the URL from which the web page was fetched. If the identification matches, the web page was served by its true owner. If the identifications do not match, the user is provided with an indication that the URL is not the true owner of the graphical images. For example, a "counterfeit" site may look just like the site that it was intended to look like because the counterfeiter can copy the page, including the graphical images. However, if the graphical images include a hidden identifier, the user can be notified that the page is "counterfeit."

An exemplary authenticity key is constructed in such a way that "freshness" can be determined, for example using a date/time stamp. The authenticity key will also include other identifying information as described later. An exemplary authenticity key contains one or more hidden signature objects. In exemplary embodiments, the hidden signature object is a value that is the encoding of the following fields: web page hash, action, date/time, key identifier and digital signature. In exemplary embodiments, the web page hash is generating using SHA-1 on the entire web page excluding this hidden signature object. The Secure Hash Algorithm (SHA) was developed by the National Institute of Standards and Technology (NIST) and is specified in the Secure Hash Standard (SHS, FIPS 180). SHA-1 is a revision to SHA that was published in 1994. SHA-1 is also described in the ANSI X9.30 (part 2) standard. The algorithm takes a message of greater than 264 bits in length and produces a 160-bit message digest.

The action is a value used to specify the action to be performed by the browser plug-in that verifies this page. Preferably, if the user computer does not have the browser plug-in installed, the user will be informed of the required plug-in. Preferably, the user can elect to download the plug-in at the time the web page is received, in which case the web page can be displayed immediately after installing the plug-in. In exemplary embodiments if the user elects not to install the plug-in, the web page is displayed and the user is provided with an indication (e.g., a warning message displayed in a pop-up window) that the page was not authenticated. Actions are specified in a bit-wise manner so that multiple actions can be specified. For example, the action value may be defined to both display the security object (e.g., to display a bitmapped image) and to request a secure login.

The date/time field is used to specify the current date and time that the web page was delivered from the web server. This value is used by the browser plug-in to verify that the page is "fresh" (e.g., is not being replayed by a rogue site). The present invention may include a synchronization feature which allows the user's computer to synchronize its internal clock with atomic clocks available over the Internet. This would provide additional security by allowing a more precise verification of the date/time stamp.

The key identifier is used to identify the public key used to verify the signature. In exemplary embodiments, a digital signature is used as a salt value concatenated with an SHA-1 hash of the other four fields (web page hash, action, date/time and key identifier) that has been encrypted using the private key of the web Page server. A "salt value" is an arbitrary random value that constantly changes in order to minimize the possibility of various attacks.

In exemplary embodiments of the present invention, four keys are used in the web page authentication process: a private key, a public key, a master encryption key and a preferences encryption key. A private key (of the web page server) is used to create the "digital signature" within the web page signature. A digital signature is generally defined to include a certificate. For the purposes of the present invention, exemplary embodiments do not include a certificate. It will be appreciated that various embodiments can include a certificate in the digital signature. The private key is only distributed to applications requiring its use. A public key is buried in multiple pieces throughout the browser plug-in. The public key is used to verify the Digital Signature within the web Page signature. Although the public key itself can be distributed, its storage location should remain as obscure as possible to reduce the possibility of attacks. The master encryption key is also buried in multiple places in the browser plug-in. The master encryption key is used to encrypt the preferences encryption key that is stored on the user's computer. The preferences encryption key that is stored on the user's computer is used to encrypt preferences (e.g., user configuration information, such as appearance and location of authenticity stamp) that are stored on the user's computer.

When the action indicates a Login, the browser plug-in displays a user ID and password request on the user's computer along with the secure word that will authenticate the UserID and Password request. These two values will be prefixed with the salt value and date/time information from the web page signature and encrypted using the public key. This information will then be sent by the plug-in performing the Submit. Preferably, the Submit explicitly references the URL to which the information is to be sent. This will allow the information only to be sent to the destination that was previously signed within the web Page signature.

The preferences file is used to store information, such as a user's secure word. Preferably, the preferences file is placed in a random directory to help obscure the location of the preference file and facilitate the creation of unique user configurations. This increases the difficulty in creating a general purpose rogue program for extracting preferences and keys.

In exemplary embodiments, new keys are implemented through redistribution of the browser plug-in. The new plug-in can contain both the old and new keys to facilitate implementation of the new keys on a particular date.

In exemplary embodiments of the invention, the authentication module may contain a list of all known UserIDs. The list of known UserIDs can be displayed so that the user can select a desired UserID. Upon selection of a UserID, the user is prompted to enter a password. The UserID and password are encrypted with the use of the public key to authenticate the authenticity key. The entire string (e.g., [UserID][Password][original salt value]) is sent to the trusted server for verification. The trusted server 120 then extracts the UserID and password and forwards them to the authentication server 140 for verification.

Exemplary embodiments allow a user to check the validity of their authentication module. A server allows the authentication module to send a request for self-verification. In various embodiments, the validation is performed in response to a user request. In exemplary embodiments, the authentication module includes a suitable user interface which allows a user to request self-verification. The authentication module generates a random number ("salt") and encrypts it with the public key. The value is then sent to a known URL (e.g., a URL that is hard-coded in the authentication module). When the authentication module receives the request, it is decrypted using the private key and adding an additional salt value which is then returned to the client module (user). The client module decrypts the response received from the authentication module. The random values are then compared (without the additional salt added by the authentication module). If the value matches the value originally sent, the self-verification is successful. A verification result is displayed to the user to indicate whether the verification was successful.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. For a basic introduction of cryptography, please review a text written by Bruce Schneider which is entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

To simplify the description of the exemplary embodiments, the invention is frequently described as pertaining to an authentication system. It will be appreciated, however, that many applications of the present invention could be formulated. One skilled in the art will appreciate that the network may include any system for exchanging data or transacting business, such as the Internet, an intranet, an extranet, WAN, LAN, satellite communications, and/or the like. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, while the exemplary embodiment will be described as an authentication system, the system contemplates the use, sale or distribution of any goods, services or information over any network having similar functionality described herein.

The customer and merchant may represent individual people, entities, or business. The bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing system to facilitate online commerce transactions. The customer has a computing unit in the form of a personal computer, although other types of computing units may be used including laptops, notebooks, hand held computers, set-top boxes, and the like. The merchant has a computing unit implemented in the form of a computer-server, although other implementations are possible. The bank has a computing center shown as a main frame computer. However, the bank computing center may be implemented in other forms, such as a mini-computer, a PC server, a network set of computers, and the like.

The computing units are connected with each other via a data communication network. The network is a public network and assumed to be insecure and open to eavesdroppers. In the illustrated implementation, the network is embodied as the internet. In this context, the computers may or may not be connected to the internet at all times. For instance, the customer computer may employ a modem to occasionally connect to the internet, whereas the bank computing center might maintain a permanent connection to the internet. It is noted that the network may be implemented as other types of networks, such as an interactive television (ITV) network.

Any merchant computer and bank computer are interconnected via a second network, referred to as a payment network. The payment network represents existing proprietary networks that presently accommodate transactions for credit cards, debit cards, and other types of financial/banking cards. The payment network is a closed network that is assumed to be secure from eavesdroppers. Examples of the payment network include the American Express®, VisaNet® and the Veriphone® network. In an exemplary embodiment, the electronic commerce system is implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

The corresponding structures, materials, acts and equivalents of all elements in the claims below are intended to include any structure, material or acts for performing the functions in combination with other claimed elements as specifically claimed. The scope of the invention should be determined by the allowed claims and their legal equivalents, rather than by the examples given above.

The invention claimed is:

1. A method comprising:
    transforming, at an authentication host computer, received data by inserting an authenticity key to create formatted data; and
    returning, from the authentication host computer, the formatted data (i) to enable the authenticity key to be retrieved from the formatted data and (ii) to locate a preferences file,
    wherein an authenticity stamp is retrieved from the preferences file.

2. The method of claim 1, wherein the formatted data is a web page.

3. The method of claim 1, further comprising:
    reading the formatted data; and,
    verifying authenticity of the formatted data based on the authenticity key in response to the formatted data including the authenticity key.

4. The method of claim 3, further comprising displaying the formatted data in response to the verification of the authenticity key.

5. The method of claim 3, wherein the authenticity stamp is displayed for formatted data that is verified.

6. The method of claim 3, wherein the authenticity stamp is displayed for a graphical image within the formatted data.

7. The method of claim 3, wherein a non-authenticity stamp is displayed for formatted data that is not verified.

8. The method of claim 1, wherein the formatted data is at least one of: a screen display or a Uniform Resource Locator (URL).

9. The method of claim 1, further comprising receiving third party data.

10. The method of claim 1, further transforming received data by inserting a second authenticity key into the received data.

11. The method of claim 1, wherein the authenticity key is received from a third-party.

12. The method of claim 1, further comprising retrieving additional data based on the received data.

13. The method of claim 1, further comprising validating the formatted data based on the authenticity key and, further transforming by inserting a second authenticity key into the formatted data.

14. The method of claim 1, further comprising retrieving an image selection based on a selection from a plurality of images, wherein the plurality of images are only known by a client and a challenge server.

15. The method of claim 14, wherein the image selection is at least one of: a graphic, text, video, or audio.

16. The method of claim 1, wherein the returning includes returning the formatted data to at least one of: a Personal Computer (PC), Personal Digital Assistant (PDA), cellular telephone, or an email device.

17. An authentication system comprising:
    an authentication processor configured to insert an authenticity key into formatted data to enable authentication of the authenticity key (i) to verify a source of the formatted data and (ii) to retrieve an authenticity stamp from a preferences file.

18. The system of claim 17, wherein the formatted data is displayed on a client.

19. The system of claim 17, wherein the authentication processor is further configured to send the formatted data including the authenticity key to a client.

20. The system of claim 19, wherein authenticity of the formatted data is verified based on the authenticity key.

21. The system of claim 20, wherein the formatted data is displayed with an indication of the authenticity of the formatted data.

22. The system of claim 17, wherein the authentication processor is further configured to receive the formatted data from a third party.

23. The system of claim 17, wherein the authentication processor is further configured to receive the formatted data having the authenticity key and, to insert a second authenticity key into the formatted data.

24. The system of claim 17, wherein the authentication processor is further configured to receive a preferences key from a third party.

25. The system of claim 17, wherein the authentication processor is further configured to receive additional data based the formatted data.

26. The system of claim 17, wherein the authentication processor is further configured to validate the formatted data based on the authenticity key and, to insert a second authenticity key into the formatted data.

27. The system of claim 17, wherein the authentication processor is further configured to receive an image selection that is at least one of: a graphic, text, video, or audio from the source based on a selection from a plurality of images, wherein the plurality of images are only known by a client and a challenge server.

28. The system of claim 17, wherein a client authenticates the authenticity key and the client is at least one of: a Personal Computer (PC), Personal Digital Assistant (PDA), cellular telephone, or an email device.

29. An authentication system comprising:
    an authentication processor configured to send formatted data having an authenticity key to a client, wherein the authenticity key enables location of a preferences file, and wherein an authenticity stamp is retrieved from the preferences file.

30. The system of claim 29, wherein at least one of color or positioning of a graphic image within the formatted data is configurable.

31. A computer readable medium having stored thereon a plurality of instructions, the plurality of instructions comprising:
    instructions to format received data by inserting an authenticity key to create formatted data; and
    instructions to return the formatted data to a client, wherein the authenticity key is retrieved from the formatted data to locate a preferences file, and wherein an authenticity stamp is retrieved from the preferences file.

32. A method comprising:
    receiving, at a client computer, formatted data from a authentication host computer wherein the authentication host computer receives the data to create received data, and transforms the received data by inserting an authenticity key to create the formatted data;
    retrieving, by the client computer, the authenticity key from the formatted data to locate a preferences file; and,
    retrieving an authenticity stamp from the preferences file.

* * * * *

UNITED STATES PATENT AND TRADEMARK OFFICE
CERTIFICATE OF CORRECTION

| | | |
|---|---|---|
| PATENT NO. | : 7,631,191 B2 | Page 1 of 1 |
| APPLICATION NO. | : 11/423340 | |
| DATED | : December 8, 2009 | |
| INVENTOR(S) | : Glazer et al. | |

It is certified that error appears in the above-identified patent and that said Letters Patent is hereby corrected as shown below:

Title Page item 76 the inventors' full addresses are inappropriately listed on the face of the patent. City, State and Country should be listed only.

Claim 1, column 12, line 14, "data (i) to" should be changed to --data to--; line 15, "and (ii) to" should be changed to --and to--.

Claim 10, column 12, line 41, "transforming received" should be changed to --transforming the received--.

Claim 13, column 12, line 50, "transforming by" should be changed to --transforming the received data by--.

Claim 16, column 12, line 60, "Computer (PC), Personal Digital Assistant (PDA), cellular" should be changed to --Computer (PC), a Personal Digital Assistant (PDA), a cellular--.

Claim 17, column 12, line 65, "key (i) to" should be changed to --key to--; line 66, "and (ii) to" should be changed to --and to--.

Claim 25, column 13, line 23, "based the" should be changed to --based on the--.

Claim 28, column 14, line 3, "Computer (PC), Personal Digital Assistant (PDA), cellular" should be changed to --Computer (PC), a Personal Digital Assistant (PDA), a cellular--.

Claim 32, column 14, lines 24 to 25, "from a authentication" should be changed to --from an authentication--.

Signed and Sealed this

Eleventh Day of May, 2010

David J. Kappos
*Director of the United States Patent and Trademark Office*